Dec. 2, 1924.
E. BRUNEAU
1,517,825
TRIPOD
Filed June 21, 1923
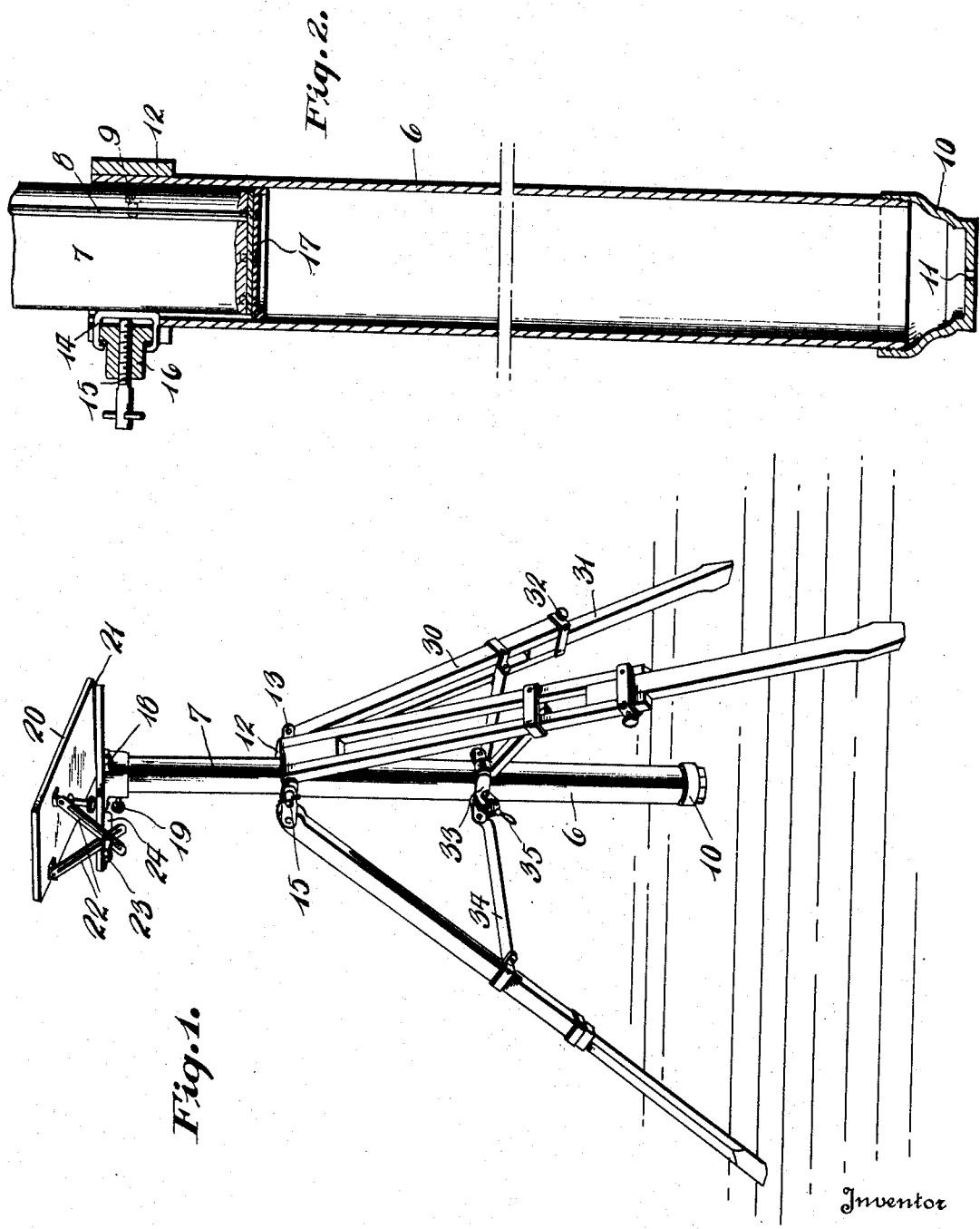
Inventor
Eugene Bruneau
By Geo. E. Tew
Attorney Patented Dec. 2, 1924.

1,517,825

UNITED STATES PATENT OFFICE.

EUGENE BRUNEAU, OF WASHINGTON, DISTRICT OF COLUMBIA.

TRIPOD.

Application filed June 21, 1923. Serial No. 646,914.

*To all whom it may concern:*

Be it known that I, EUGENE BRUNEAU, a citizen of the United States, residing at Washington, District of Columbia, have invented certain new and useful Improvements in Tripods, of which the following is a specification.

This invention relates to tripods, and has for its object to provide an improved tripod especially adapted and intended for the support of a camera, and having advantages as will more fully appear from the following description.

Ordinary tripods require two hands for their manipulation, in effecting the various adjustments. This is often inconvenient, as in commercial photography, the subjects are often in motion, and the pictures have to be taken quickly and one hand is usually employed in adjusting the camera with respect to direction and focus. With such old tripods, when for example, the screw supporting the stem of the tripod is released for vertical adjustment, said stem, with the weight of a heavy camera upon it will often drop suddenly with considerable shock and general inconvenience.

The tripod forming the subject of the present invention employs a central tube in which a stem or post slides, with an air cushion under the stem having a slow release, whereby the clamp screw can be released by one hand, and the supporting posts and camera will descend slowly to the required position where it can be caught by a quick turn of the screw. Also, when the screw is released, the stem and camera can be lifted by one hand, owing particularly to the absence of much friction between the stem and the tube. It will be appreciated with an ordinary telescoping tube having a close fit, the stand will have to be held down with one hand while the other hand is used to lift the camera. This inconvenience is avoided by means of the present invention.

The device is also provided with certain other improvements as will more fully appear hereinafter.

In the accompanying drawings Fig. 1 is a perspective view of the tripod. Fig. 2 is an enlarged detail in vertical section of the central tube and plunger or post.

The central tube is indicated at 6 and receives the post or plunger 7 at a loose fit, the plunger having a groove 8 which receives a screw 9 extending through the tube to prevent turning of the plunger and also to prevent it being pulled out of the tube. At the bottom, the tube is closed by a cap 10 having a small vent 11. At the top the tube is provided with a ring 12 fixed thereto, to which the legs are pivoted as indicated at 13, and at one side the ring or collar 12 has a recess in which is located a clamp plate 14 which may be pressed from behind by a hand screw 15, tapped through a boss 16 on the ring, to advance the clamp plate 14 to hold in contact with the plunger or post 7. At the bottom, the plunger has a cup leather 17 which traps the air in the tube 6 on downward movement of the plunger.

At the top, the plunger supports a rotatable cap plate 18 which may be fixed at adjustment by a thumb screw 19, and a board 20 is hinged at one edge to the edge of the cap plate as indicated at 21. Near its opposite edge the board 20 is provided on the under side with a pair of pivoted links 22 which are slotted lengthwise to receive a thumb screw 23 tapped into a fixture 24 on the cap plate, and by means of which the board 20 can be held at any inclination at which it may be set. The camera will be attached upon the board 20 in any suitable manner. By releasing the screw 23, the board can be swung to any desired angle, this action being permitted by the slots in the links 22.

The legs of the tripod may be of any suitable construction. They are shown extensible, consisting of sections 30 and 31 adapted to be clamped at adjustment by screws 32, and each leg is connected to a collar 33 by means of a pivoted link 34, the collar being slidable up and down on the tube 6 and provided with a clamp device 35 to hold it at adjustment. This construction permits the legs to be folded up against the tube for convenient transportation, or to be extended and fastened to form a stand.

In the use of the device, when the screw 15 is loosened, the weight of the plunger and the parts supported thereby will cause it to descend, but the air cushion in the tube will prevent any sudden drop, and as the air escapes through the small hole 11 the plunger will descend slowly and may be caught when it reaches the desired position by tightening the screw 15. This can be done with one hand. When the screw is loosened the plunger can be grasped and slowly lifted with one hand to a desired position and then fixed by the set screw. The only friction of any moment between the plunger and the tube is that due to the contact of the cup leather 17 with the inside of the tube, consequently the action is rather easy and the plunger does not have to be pressed down with force, as is often the case with ordinary telescoping tube; nor will the friction resist the lifting of the plunger. When the plunger descends, the weight is supported by the air cushion so that the action proceeds without shock or sudden drop. The use of the device has been found to be attended with much convenience and freedom from accidents. Obviously the device may be used for supporting instruments other than cameras. The connection between the legs and the collar 33 which is adjustable on the tube 36 also gives a very rigid support for the instrument with which the tripod may be used.

I claim:

1. A tripod comprising a tube provided with legs, the tube having a small vent at the bottom, and a plunger slidable up and down in the tube and provided with packing therein and having an instrument support at the top.

2. A tripod as set forth in claim 1, the plunger having a relatively loose fit in the tube except at the packing, and a clamp mounted on the tube and engaging with the plunger to hold the latter at adjustment.

3. A tripod comprising a central tube having a restricted opening at its lower end, legs pivoted to the upper end of the tube, and a plunger slidable loosely up and down in the tube and having a packing at its lower end to confine air in the tube, and means carried at the upper end of the plunger to support an instrument.

In testimony whereof, I affix my signature.

EUGENE BRUNEAU.